United States Patent
Wu et al.

(10) Patent No.: US 10,559,321 B1
(45) Date of Patent: Feb. 11, 2020

(54) TIMING LOOP FOR ADJACENT TRACK INTERFERENCE CANCELLATION

(71) Applicant: Seagate Technology LLC, Cupertino, CA (US)

(72) Inventors: Zheng Wu, San Jose, CA (US); Jason Bellorado, San Jose, CA (US); Marcus Marrow, San Jose, CA (US); Vincent B Ashe, San Jose, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/274,669

(22) Filed: Feb. 13, 2019

(51) Int. Cl.
*G11B 5/09* (2006.01)
*G11B 20/10* (2006.01)

(52) U.S. Cl.
CPC .. *G11B 20/10212* (2013.01); *G11B 20/10259* (2013.01); *G11B 20/10398* (2013.01)

(58) Field of Classification Search
CPC ........... G11B 27/36; G11B 20/18; G11B 5/09; G11B 20/0013; G11B 20/10222; G11B 5/035; G11B 20/10046; G11B 20/10027; G11B 5/02

USPC ...................... 360/31, 39, 51, 67, 68, 65, 46
See application file for complete search history.

(56) References Cited

U.S. PATENT DOCUMENTS

| | | | |
|---|---|---|---|
| 6,788,485 B2 * | 9/2004 | Ashley | G11B 5/09 360/51 |
| 8,693,119 B2 | 4/2014 | Mathew et al. | |
| 9,947,362 B1 | 4/2018 | Venkataramani et al. | |

* cited by examiner

*Primary Examiner* — Nabil Z Hindi
(74) *Attorney, Agent, or Firm* — Holzer Patel Drennan (57) ABSTRACT

In one implementation, the disclosure provides a system including a first circuit to compute a timing error based on a received error signal and an estimated interference signal and a timing loop filter to output a frequency offset and a phase shift based on the timing error received as input. The system also includes a phase accumulator to accumulate at least a phase shift to generate a sample index and phase and an interpolation filter to generate samples of a side track signal using the sample index and phase.

20 Claims, 6 Drawing Sheets

TIMING LOOP FOR ADJACENT TRACK INTERFERENCE CANCELLATION

BACKGROUND

As areal density on storage devices is increased, the tracks per inch (TPI) also increases. As the data tracks move closer together, adjacent track interference (ATI) from a side track when reading a center track becomes more likely. To improve the accuracy of reading the center track, some techniques estimate the side track interfering signal and cancel it from the read center track signal. This technique is usually called adjacent track interference cancellation (ATIC).

However, conventional ATIC may not accurately capture phase shifts due to changes in the relative phase of the center track and the side track data during a sector.

SUMMARY

In one implementation, the disclosure provides a system including a first circuit to compute a timing error based on a received error signal and an estimated interference signal and a timing loop filter to output a frequency offset and a phase shift based on the timing error received as input. The system also includes a phase accumulator to accumulate at least a phase shift to generate a sample index and phase and an interpolation filter to generate samples of a side track signal using the sample index and phase.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
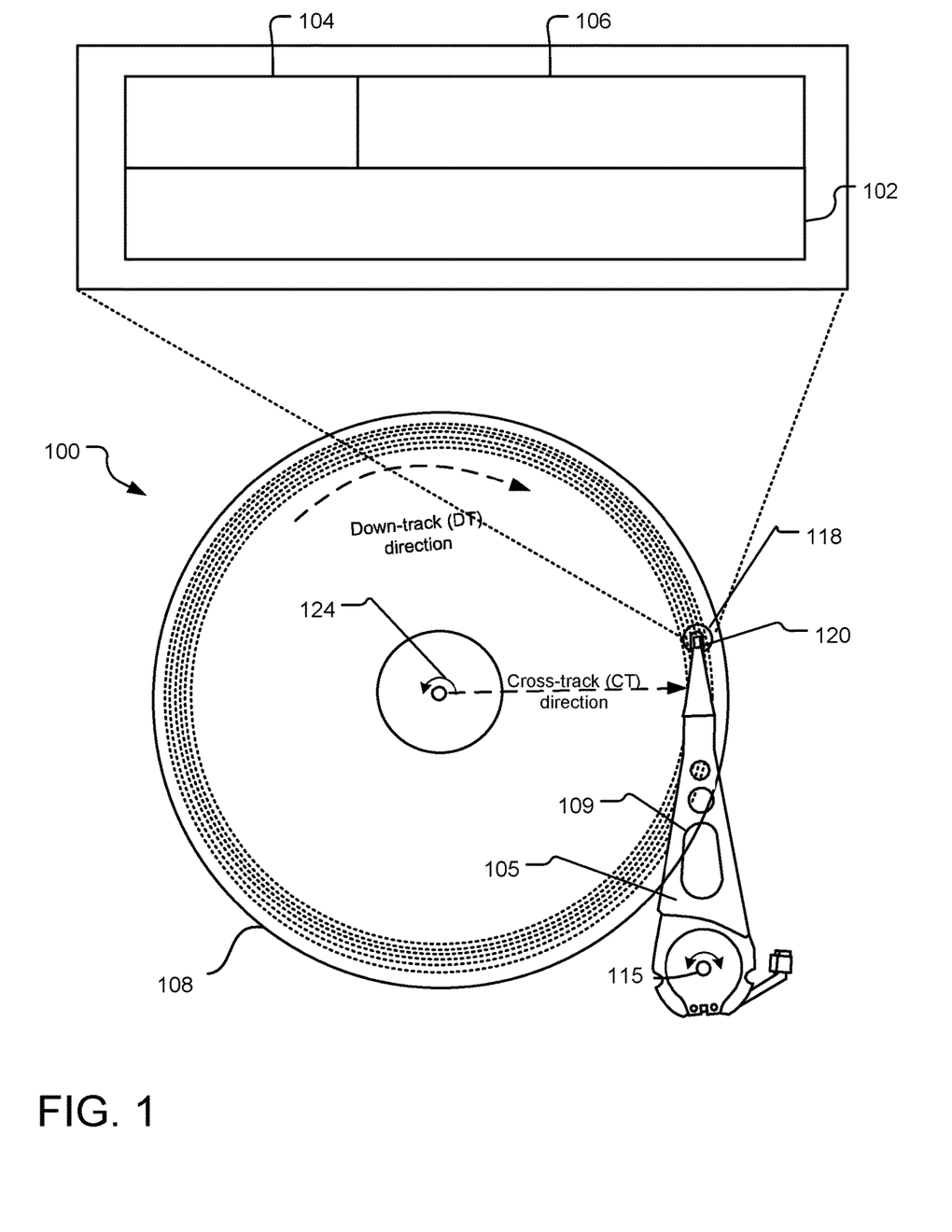
FIG. 1 illustrates an example data storage device including a center data track and side data tracks.

FIG. 1 illustrates an example data storage device 100 including a center data track 102 and data track sectors 104 and 106 of a side data track. The example data storage device 100 may use several methods, including, without limitation, two-dimensional magnetic recording (TMDR) or heat assisted magnetic recording (HAMR) to encode data on a magnetic storage medium 108. The magnetic storage medium 108 is a magnetic storage disc on which data can be recorded using a write pole 130. As illustrated in View A, the magnetic storage medium 108 rotates about a spindle center or a disc axis of rotation 112. Information may be written to and read from a number of concentric data tracks 118 located on the magnetic storage medium 108.

A transducer head assembly 120 is mounted on an actuator assembly 109 at an end distal to an actuator axis of rotation 115. The transducer head assembly 120 flies in close proximity above the surface of the storage medium 108 during disc rotation. The actuator assembly 109 rotates during a seek operation about the actuator axis of rotation 115. The seek operation positions the transducer head assembly 120 over a target data track for read and write operations.

Referring to View B, the center data track 102 is located adjacent to the side data track sector 104 and the side data track sector 106 on the magnetic storage medium 108. As the area density on the magnetic storage medium 108 is increased, the distance between data tracks, such as the distance between the center data track 102 and the side data track with sectors 104 and 106 decreases. As the distance between data tracks decreases, the interference from the side data track sectors 104 and 106 grows when the center data track sector 102 is read.

As shown in View B, when the center data track 102 is read, both the side data track sector 104 and the side data track sector 106 may contribute interference. When the side data track sector 104 and the side data track sector 106 do not have the same phase, the relative phase between the center data track 102 and the side data track sectors 104 and 106 changes during the read operation. Conventional systems for ATIC do not account for the changes in relative phase between the center data track 102 and the side data track sectors 104 and 106, which can cause inaccurate estimations of the side data track sectors 104 and 106. The addition of a timing loop to the system for ATIC allows the pulse shape to remain relatively unchanged during the read operation, even with multiple side tracks or other changes in relative phase. Accordingly, the estimate of the side track signal is more accurate.

Figure 2:
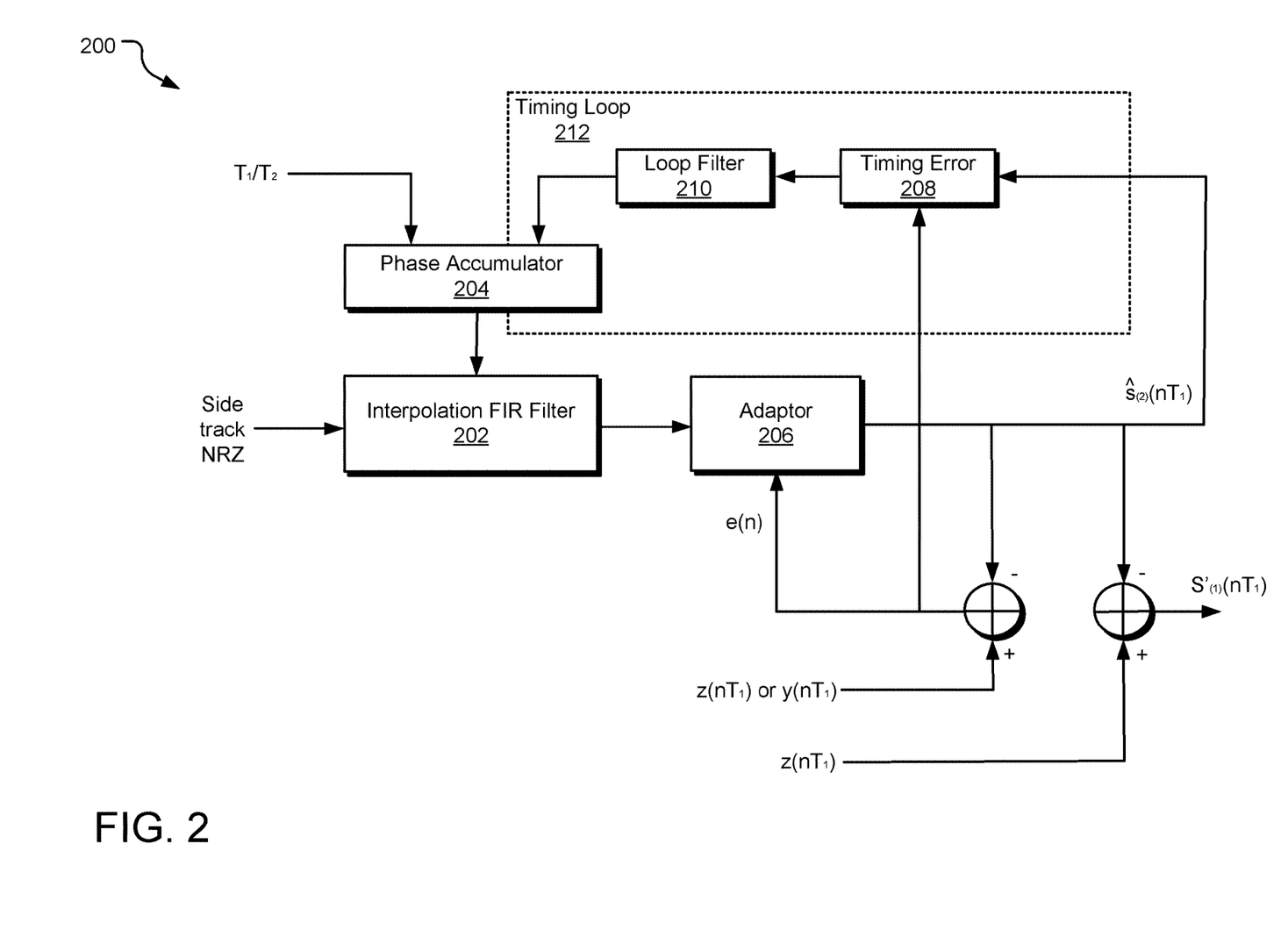
FIG. 2 illustrates an example system for performing ATIC using a timing loop.

FIG. 2 illustrates an example system 200 for performing ATIC using a timing loop 210. The example system performs ATIC by using the timing loop 210 to handle the frequency offset and phase shifts between a center data track and one or more side data tracks. The timing loop 210 allows the example system 200 to respond to a phase shift fairly quickly. Assuming the center track has a data rate or frequency $f_1$ and a period $T_1$ and the side track has a frequency $f_2$ and a period $T_2$, the signal read from the center track can be written as:

$$z(t)=s^{(1)}(t)+s^{(2)}(t)+N(t)$$

where $s^{(1)}(t)$ is the center track signal, $s^{(2)}(t)$ is the side track signal, and $N(t)$ is the noise. The digitized signal (with index n) can be written as:

$$z(nT_1)=s^{(1)}(nT_1)+s^{(2)}(nT_1)+N(nT_1).$$

Using an estimation of the center track signal, $\hat{s}^{(1)}(nT_1)$, a read error signal can be written as:

$$y(nT_1)=z(nT_1)-\hat{s}^{(1)}(nT_1).$$

The read error signal or the signal read from the center track $z(nT_1)$ can be used to generate an estimate of the side track signal $\hat{s}^{(2)}(nT_2)$.

The estimate of the side track signal $\hat{s}^{(2)}(nT_2)$ is fed into the timing loop 212 along with an error signal e(n). A timing error generator 208 computes the timing error. In one implementation, the timing error may be computed using the formula:

$$e_T(n) = e(n)[(\hat{s}^{(2)}((n+1)T_1)) - (\hat{s}^{(2)}((n-1)T_1))].$$

The timing error is used to estimate a frequency offset and generate a phase shift. The phase shift may then be accumulated together with a side track to center track ratio $T_1/T_2$ to generate a proper sample index and phase.

A clean center track signal is generated by subtracting the estimated side track signal $\hat{s}^{(2)}(nT_2)$ from the signal read from the center track $z(nT_1)$.

The example system 200 performs ATIC by receiving the side track signal. In the system shown in FIG. 2, the side track signal is received in a non-return to zero (NRZ) format. An interpolation finite impulse response (FIR) filter 202 receives the side track signal. The interpolation FIR filter 202 also receives a sample index and phase from a phase accumulator 204. In the first iteration, before feedback input from the timing loop, the sample index and phase is generated by the phase accumulator 204 based on a side track to center track frequency ratio, $T_1/T_2$. When the timing loop is used, the phase accumulator 204 accumulates a phase shift together with the side track to center track frequency ratio to generate a sample index and phase. The interpolation FIR filter 202 generates samples of a side track signal by sampling the side track signal at sample index and phase. In the example system 200 shown in FIG. 2, the interpolation FIR filter 202 generates one stream of side track samples d(n). However, in other implementations the interpolation FIR filter 202 may generate parallel streams of side track samples.

An adaptor 206 generates the estimated side track signal $\hat{s}^{(2)}(nT_1)$ from the samples of the side track signal generated by the interpolation FIR filter 202 and an error signal e(n). The error signal e(n) is computed by subtracting the estimated side track signal $\hat{s}^{(2)}(nT_1)$ from either the read back signal of the center track $z(nT_1)$ or the read error signal $y(nT_1)$. The estimated side track signal $\hat{s}^{(2)}(nT_1)$ and the error signal e(n) are received by a timing error circuit 208. The timing error circuit 208 computes the timing error from the error signal and the estimated side track signal. In one implementation, the timing error is computed using the following formula:

$$e_T(n) = e(n)[(\hat{s}^{(2)}((n+1)T_1)) - (\hat{s}^{(2)}((n-1)T_1))].$$

The timing error $e_T(n)$ is fed into a loop filter 210. The loop filter 210 may be, in one implementation, a simple second order filter. The loop filter 210 uses the timing error $e_T(n)$ to estimate a frequency offset and a phase shift. The phase shift is accumulated together with the side track to center track ratio by the phase accumulator 204 to generate a sample index and phase for the interpolation FIR filter 202, allowing the interpolation FIR filter 202 to sample with a more accurate index and phase, so that the adaptor 206 can generate a more accurate estimate of the side track signal $\hat{s}^{(2)}(nT_1)$. The clean center track signal with the interference cancelled is generated by subtracting the estimated side track signal $\hat{s}^{(2)}(nT_1)$ from the read back signal of the center track $z(nT_1)$.

Figure 3:
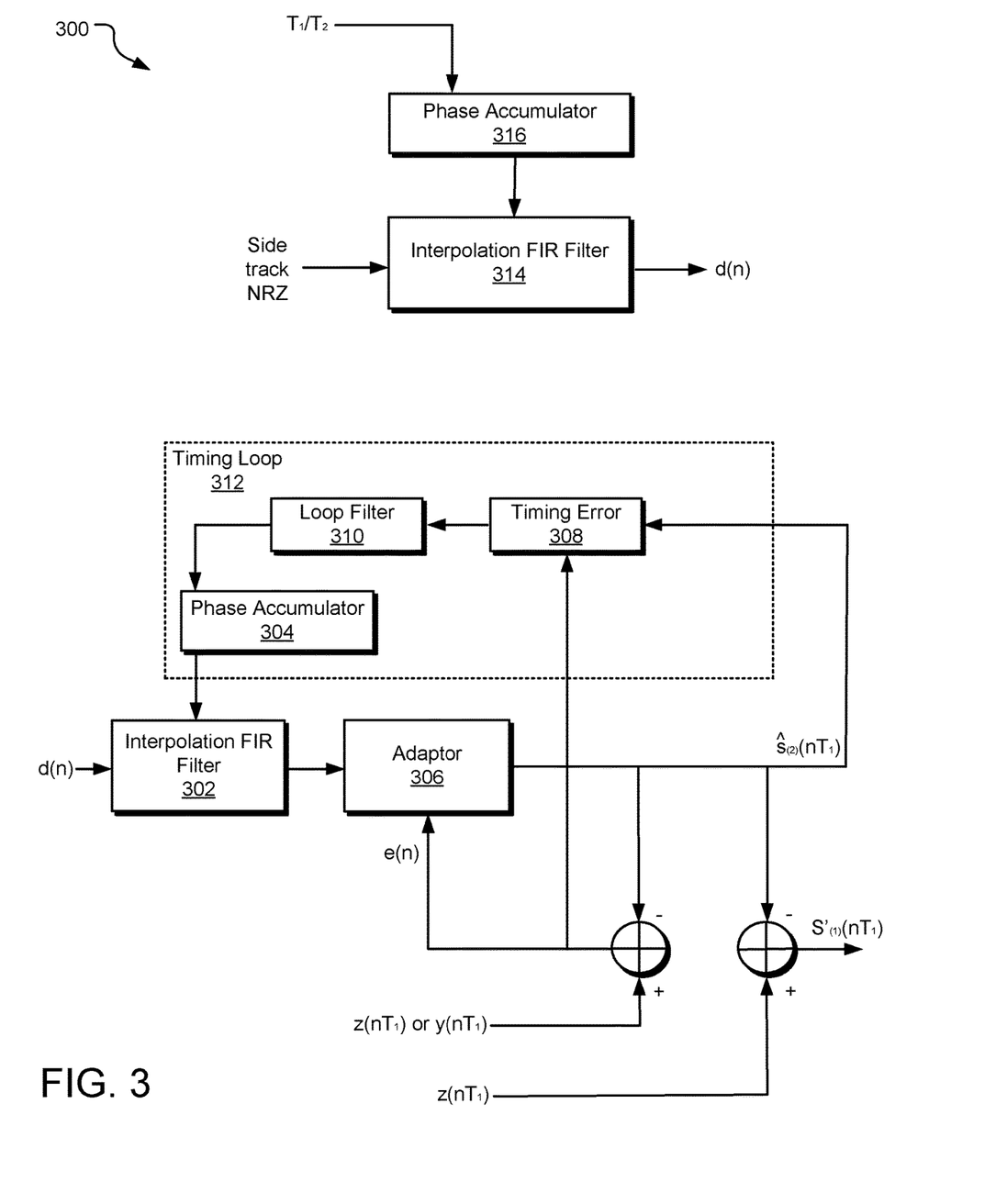
FIG. 3 illustrates an example system for performing ATIC using a timing loop and a time varying interpolation FIR structure.

FIG. 3 illustrates an example system 300 for performing ATIC using a timing loop and a time varying interpolation FIR structure. In the example system 300 shown in FIG. 3, a first interpolation FIR filter 314 in combination with a first phase accumulator 316 produces a first stream of side track samples d(n), capturing the data rate change between the side track and the center track. The first phase accumulator 316 receives a side track to center track ratio $T_1/T_2$ and generates a sample index and phase. The first interpolation FIR filter 314 samples the side track signal at the sample index and phase generated by the first phase accumulator 316 to produce the first stream of side track samples. The first stream of side track samples may be stored in memory or may be provided directly to a second interpolation FIR filter 302.

The second interpolation FIR filter 302 completes the phase change with feedback from a timing loop 312. The second interpolation FIR filter 302 receives the first stream of side track samples d(n). In one implementation, the second interpolation FIR filter 302 receives the first stream of side track samples d(n) directly from the first interpolation FIR filter 314. In another implementation, the second interpolation FIR filter 302 receives the first stream of side track samples d(n) from a location in memory. The second interpolation FIR filter 302 generates a second stream of side track samples d'(n). When the timing loop is used, the second interpolation FIR filter 302 receives a sample index and phase from a second phase accumulator 304. The second interpolation FIR filter 302 then generates the second stream of side track samples d'(n) using the first stream of side track samples d(n) and the sample index and phase.

An adaptor 206 generates the estimated side track signal $\hat{s}^{(2)}(nT_1)$ from the samples of the side track signal generated by the second interpolation FIR filter 302 and an error signal e(n). The error signal e(n) is computed by subtracting the estimated side track signal $\hat{s}^{(2)}(nT_1)$ from either the read back signal of the center track $z(nT_1)$ or the read error signal $y(nT_1)$. The estimated side track signal $\hat{s}^{(2)}(nT_1)$ and the error signal e(n) are received by a timing error circuit 308. The timing error circuit 308 computes the timing error from the error signal and the estimated side track signal. In one implementation, the timing error is computed using the following formula:

$$e_T(n) = e(n)[(\hat{s}^{(2)}((n+1)T_1)) - (\hat{s}^{(2)}((n-1)T_1))].$$

The timing error $e_T(n)$ is fed into a loop filter 310. The loop filter 310 uses the timing error $e_T(n)$ to estimate a frequency offset and a phase shift. The phase shift is accumulated by the second phase accumulator 304 to generate a sample index and phase for the second interpolation FIR filter 302, allowing the second interpolation FIR filter 302 to sample with a more accurate index and phase, so that the second adaptor 306 can generate a more accurate estimate of the side track signal $\hat{s}^{(2)}(nT_1)$. The clean center track signal with the interference cancelled is generated by subtracting the estimated side track signal $\hat{s}^{(2)}(nT_1)$ from the read back signal of the center track $z(nT_1)$.

Figure 4:
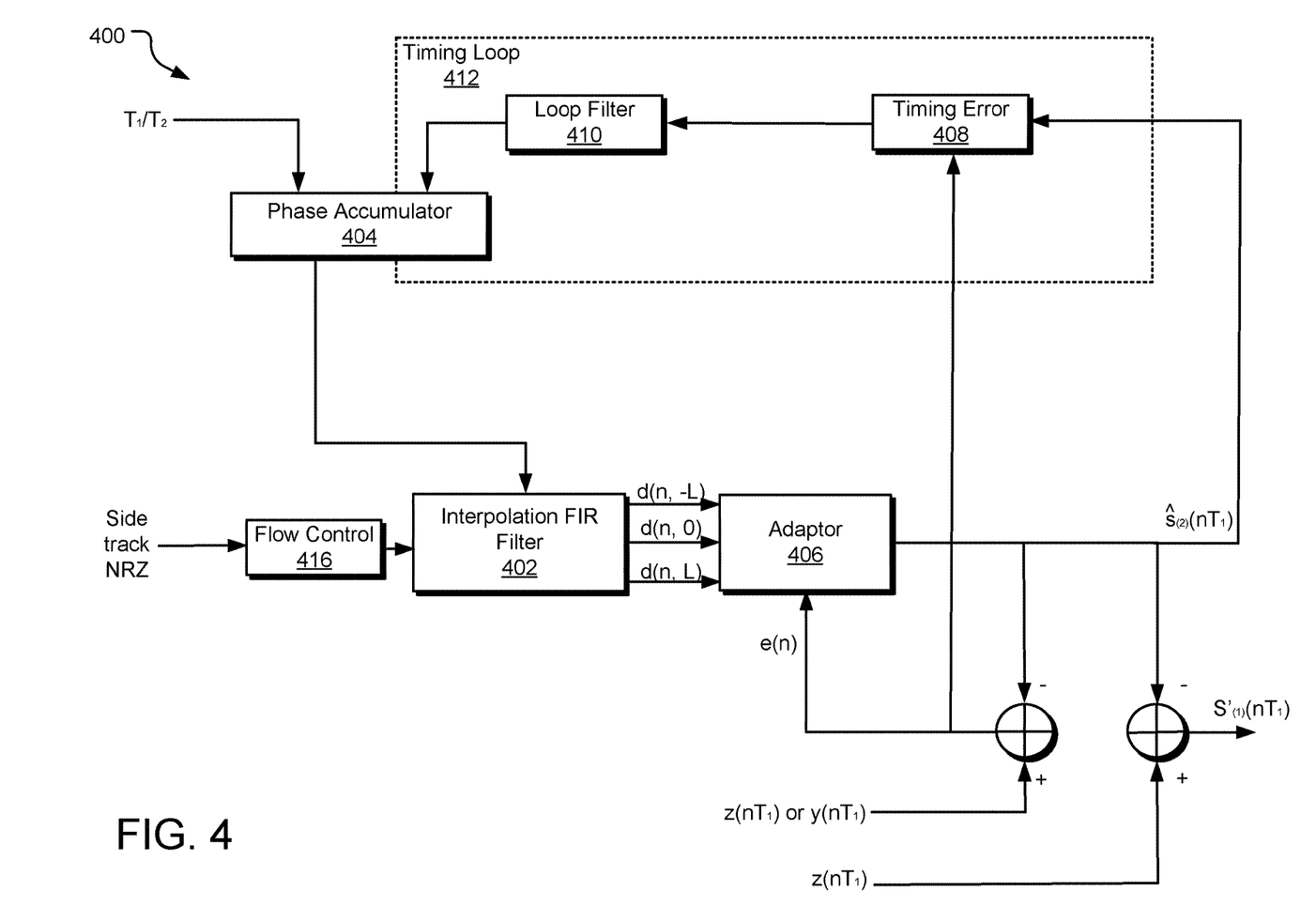
FIG. 4 illustrates an example system for performing ATIC using a separate timing loop and a side-to-center interpolation FIR.

FIG. 4 illustrates an example system 400 for performing ATIC. The example system 400 performs ATIC by subtracting an estimated side track signal from a read center track signal. In the system shown in FIG. 4, the side track signal is received in a non-return to zero (NRZ) format. The side track signal is received by an interpolation FIR filter 402 after going through flow control 416.

The interpolation FIR filter 402 also receives a sample index and phase from a phase accumulator 204. In the first iteration, before feedback input from the timing loop, the sample index and phase is generated by the phase accumulator 204 based on a side track to center track frequency ratio. When the timing loop is used, the phase accumulator 204 accumulates a phase shift together with the side track to center track frequency ratio to generate a sample index and phase. The interpolation FIR filter 402 generates parallel streams of samples of a side track signal by sampling the side track signal at the sample index and phase.

An adaptor 406 generates the estimated side track signal $\hat{s}^{(2)}(nT_1)$ from the samples of the side track signal generated by the interpolation FIR filter 202 and an error signal e(n). The error signal e(n) is computed by subtracting the estimated side track signal $\hat{s}^{(2)}(nT_1)$ from either the read back signal of the center track $z(nT_1)$ or the read error signal $y(nT_1)$. The estimated side track signal $\hat{s}^{(2)}(nT_1)$ and the error signal e(n) are received by a timing error circuit 208. The timing error circuit 408 computes the timing error from the error signal and the estimated side track signal. In one implementation, the timing error is computed using the following formula:

$$e_T(n) = e(n)[(\hat{s}^{(2)}((n+1)T_1)) - (\hat{s}^{(2)}((n-1)T_1))].$$

The timing error $e_T(n)$ is fed into a loop filter 410. The loop filter 410 uses the timing error $e_T(n)$ to estimate a frequency offset and a phase shift. The phase shift is accumulated together with the side track to center track ratio by the phase accumulator 404 to generate a sample index and phase for the interpolation FIR filter 402, allowing the interpolation FIR filter 402 to sample with a more accurate index and phase, so that the adaptor 206 can generate a more accurate estimate of the side track signal $\hat{s}^{(2)}(nT_1)$. The clean center track signal with the interference cancelled is generated by subtracting the estimated side track signal $\hat{s}^{(2)}(nT_1)$ from the read back signal of the center track $z(nT_1)$.

Figure 5:
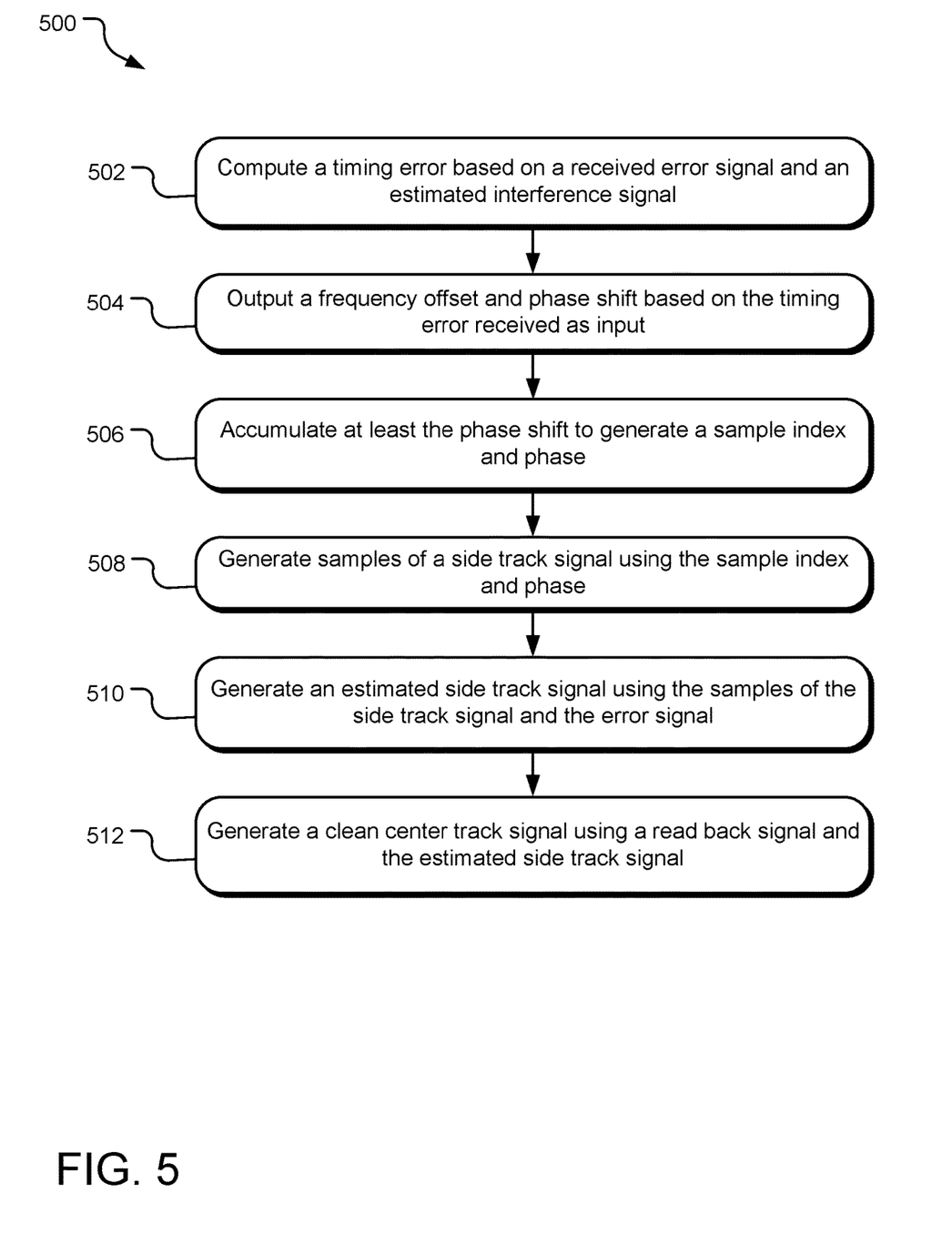
FIG. 5 illustrates example operations for performing ATIC using a timing loop.

FIG. 5 illustrates example operations 500 for performing ATIC using a timing loop. A computing operation 502 computes a timing error $e_T(n)$ based on a received error signal e(n) and an estimated interference signal $\hat{s}^{(2)}(nT_2)$. The estimated interference signal may be, for example, the estimate of a side track signal that interferes with a center track signal for adjacent center and side tracks. The timing error is computed by a timing loop. The timing loop may be part of a system that performs ATIC. In one implementation, the timing error may be computed using the formula:

$$e_T(n) = e(n)[(\hat{s}^{(2)}((n+1)T_1)) - (\hat{s}^{(2)}((n-1)T_1))]$$

where $T_1$ is the period of the center track. The timing error may be calculated by a timing error circuit that is part of the larger timing loop.

An outputting operation 504 outputs a frequency offset and phase shift based on the timing error received as input. In one implementation, the outputting operation is performed by a loop filter that is part of the timing loop.

An accumulating operation 506 accumulates at least the phase shift to generate a sample index and phase. In one implementation, the accumulating operation 506 is performed by a phase accumulator. In some implementations, the phase accumulator may accumulate the phase shift and a side track to center track frequency ratio $T_1/T_2$ to generate the sample index and phase. In another implementation, the phase accumulator may generate the sample index and phase based only on the phase shift.

A first generating operation 508 generates samples of a side track signal using the sample index and phase. In one implementation, the first generating operation 508 is performed by an interpolation FIR filter. The interpolation FIR filter generates the samples of the side track signal by sampling the side track at the sample index and phase. In some implementations, the interpolation FIR filter directly receives the side track sample. For example, in one implementation, the interpolation FIR filter receives the side track sample in a NRZ format.

In other implementations, the interpolation FIR filter receives a first stream of side track samples d(n). The first stream of side track samples d(n) may be generated by a first interpolation FIR filter sampling at a first sample index and phase, where the first sample index and phase is based on a side track to center track ratio $T_1/T_2$. The interpolation FIR filter may receive the first stream of side track samples d(n) from the first interpolation FIR filter or may retrieve the first stream of side track samples d(n) from memory.

A second generating operation 510 generates an estimated side track signal using the samples of the side track signal and the error signal. In one implementation, an adaptor performs the second generating operation 510. A third generating operation 512 generates a clean center track signal using a read back signal and the estimated side track signal. The clean center track signal may be generated by subtracting the estimated side track signal from the read back signal. The estimated side track signal is generated by convolving the resampled side track signal d(n) with an estimated pulse shape h(i). The estimated pulse shape can be obtained through LMS adaptation.

Figure 6:
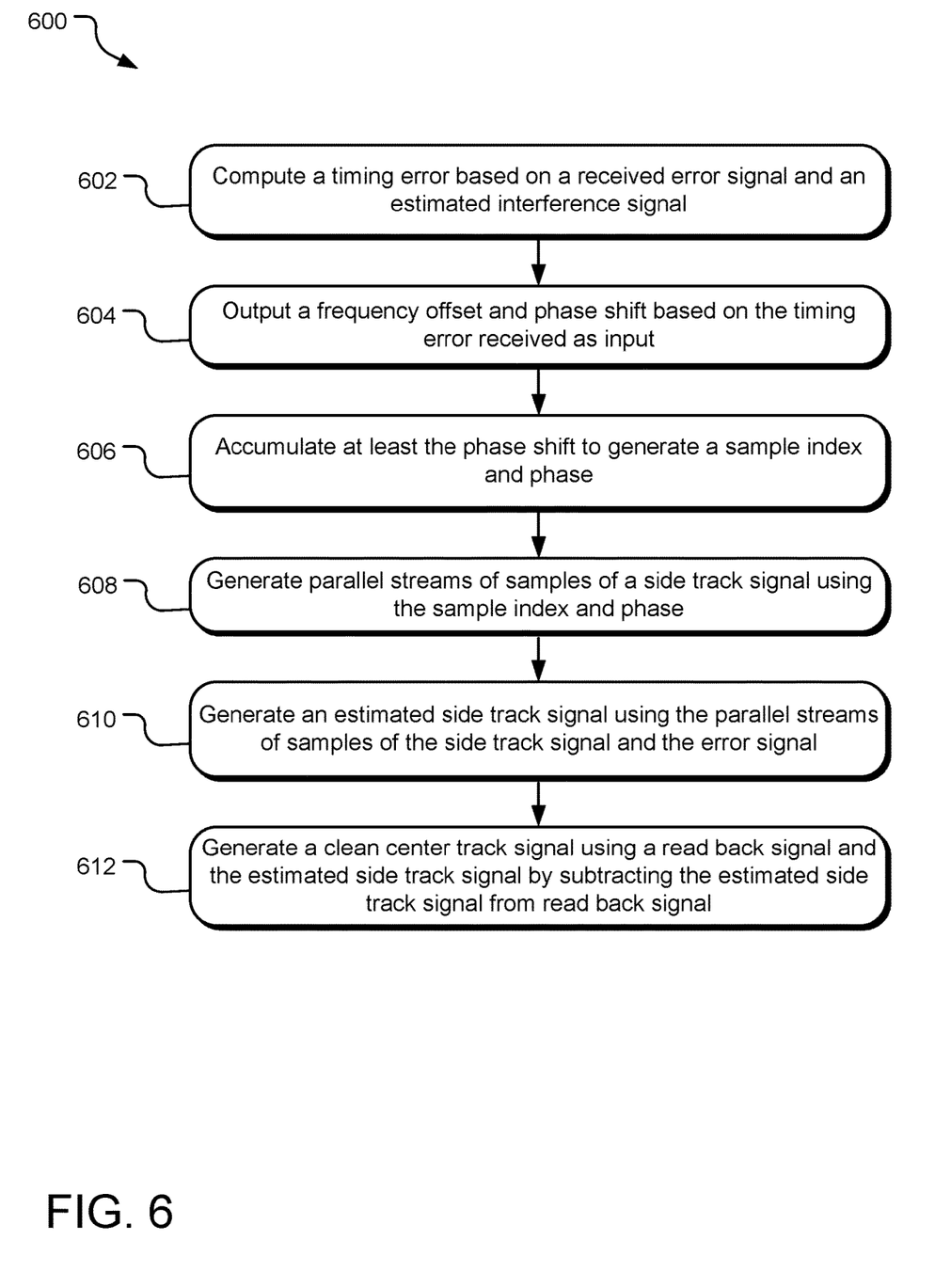
FIG. 6 illustrates example operations for performing ATIC using a timing loop and a time varying interpolation FIR structure.

FIG. 6 illustrates example operations 600 for performing ATIC using a timing loop and a time varying interpolation FIR structure. A computing operation 602 computes a timing error $e_T(n)$ based on a received error signal e(n) and an estimated interference signal $\hat{s}^{(2)}(nT_2)$. The estimated interference signal may be, for example, the estimate of a side track signal that interferes with a center track signal for adjacent center and side tracks. The timing error is computed by a timing loop. The timing loop may be part of a system that performs ATIC. In one implementation, the timing error may be computed using the formula:

$$e_T(n) = e(n)[(\hat{s}^{(2)}((n+1)T_1)) - (\hat{s}^{(2)}((n-1)T_1))]$$

where $T_1$ is the period of the center track. The timing error may be calculated by a timing error circuit that is part of the larger timing loop.

An outputting operation 604 outputs a frequency offset and phase shift based on the timing error received as input. In one implementation, the outputting operation is performed by a loop filter that is part of the timing loop.

An accumulating operation 606 accumulates at least the phase shift to generate a sample index and phase. In one implementation, the accumulating operation 506 is performed by a phase accumulator. In some implementations, the phase accumulator may accumulate the phase shift and a side track to center track frequency ratio $T_1/T_2$ to generate the sample index and phase. In another implementation, the phase accumulator may generate the sample index and phase based only on the phase shift.

A first generating operation 608 generates parallel streams of samples of a side track signal using the sample index and phase. In one implementation, the first generating operation 608 is performed by an interpolation FIR filter. The interpolation FIR filter generates the samples of the side track signal by sampling the side track signal at the sample index and phase.

A second generating operation 610 generates an estimated side track signal using the stream of samples of the side track signal and a timing error. In one implementation, an adaptor performs the second generating operation 610. A third generating operation 612 generates a clean center track signal using a read back signal and the estimated side track signal. The clean center track signal may be generated by subtracting the estimated side track signal from the read back signal. The estimated side track signal is generated by multiplying the parallel stream with the estimated pulse shape h(i). The estimated pulse shape can be obtained through LMS adaptation.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
    a first circuit configured to compute a timing error based on a received error signal and an estimated interference signal;
    a timing loop filter configured to output a frequency offset and a phase shift based on the timing error received as input;
    a phase accumulator configured to accumulate at least the phase shift to generate a sample index and a phase; and
    an interpolation filter configured to generate samples of a side track signal using the sample index and the phase.

2. The system of claim 1, wherein the phase accumulator is configured to accumulate the phase shift and a side track to center track frequency ratio to generate the sample index and phase.

3. The system of claim 1, wherein the interpolation filter is configured to generate samples of the side track signal by sampling an incoming side track signal using the sample index and the phase.

4. The system of claim 1, further comprising:
    an adaptor configured to generate an estimated side track signal using the samples of the side track signal and a timing error.

5. The system of claim 4, further comprising:
    a second circuit configured to generate a clean center track signal using a read back signal and the estimated side track signal.

6. The system of claim 5, wherein the second circuit is configured to generate the clean center track signal by subtracting the estimated side track signal from the read back signal.

7. The system of claim 1, wherein the interpolation filter is a time varying interpolation filter structure, the interpolation filter generating parallel streams of samples of the side track signal.

8. The system of claim 7, further comprising:
    an adaptor configured to generate an estimated side track signal using the stream of samples of the side track signal generated by the interpolation filter and a timing error.

9. The system of claim 8, further comprising:
    a second circuit configured to generate a clean center track signal using a read back signal and the estimated side track signal by subtracting the estimated side track signal from the read back signal.

10. The system of claim 1, further comprising:
    a second phase accumulator configured to accumulate a side track to center track frequency ratio to generate a second sample index and the phase.

11. The system of claim 10, further comprising:
    a second interpolation filter configured to generate a first stream of samples of the side track signal using the second sample index and the phase.

12. The system of claim 11, wherein the interpolation filter is configured to generate samples of the side track signal using both the first stream of samples of the side track signal and the sample index and the phase.

13. A method comprising:
    computing a timing error based on a received error signal and an estimated interference signal;
    outputting a phase shift based on the timing error;
    accumulating at least the phase shift to generate a sample index and a phase;
    generating samples of a side track signal using the sample index and the phase; and
    generating a clean center track signal using a read back signal and the estimated side track signal.

14. The method of claim 13, further comprising:
    generating an estimated side track signal using the samples of the side track signal and the error signal.

15. The method of claim 13, further comprising:
    outputting a frequency offset.

16. The method of claim 13, wherein the clean center track signal is generated by subtracting the estimated side track signal from the read back signal.

17. A method comprising:
    computing a timing error based on a received error signal and an estimated interference signal;
    outputting a phase shift based on the timing error;
    accumulating at least the phase shift to generate a sample index and a phase;
    generating parallel streams of samples of a side track signal using the sample index and the phase; and
    generating a clean center track signal using a read back signal and the estimated side track signal.

18. The method of claim 17, further comprising:
    generating an estimated side track signal using the samples of the side track signal and the error signal.

19. The method of claim 17, further comprising:
    outputting a frequency offset.

20. The method of claim 17, wherein the clean center track signal is generated by subtracting the estimated side track signal from the read back signal.

\* \* \* \* \*